(12) United States Patent
Bogren et al.

(10) Patent No.: US 11,647,038 B2
(45) Date of Patent: May 9, 2023

(54) METHOD AND SYSTEM FOR EVALUATING CYBER SECURITY RISKS

(71) Applicant: Verizon Patent and Licensing Inc., Basking Ridge, NJ (US)

(72) Inventors: Lori K. Bogren, Colorado Springs, CO (US); Katrina Marie Kutchko, Colorado Springs, CO (US); Allison J. Ashford, Lewisville, TX (US); Charles A. Dallas, Farmers Branch, TX (US); Yonatan Fridman, Divide, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 142 days.

(21) Appl. No.: 17/150,366

(22) Filed: Jan. 15, 2021

(65) Prior Publication Data
US 2022/0232031 A1 Jul. 21, 2022

(51) Int. Cl.
*H04L 29/00* (2006.01)
*H04L 9/40* (2022.01)
*H04L 41/22* (2022.01)

(52) U.S. Cl.
CPC .......... *H04L 63/1433* (2013.01); *H04L 41/22* (2013.01); *H04L 63/102* (2013.01); *H04L 63/1425* (2013.01); *H04L 63/20* (2013.01)

(58) Field of Classification Search
CPC ... H04L 63/1433; H04L 41/22; H04L 63/102; H04L 63/1425; H04L 63/20; H04L 63/1458
See application file for complete search history.

(56) References Cited

U.S. PATENT DOCUMENTS

| | | | | |
|---|---|---|---|---|
| 7,054,837 B2* | 5/2006 | Hoffman | ............ | G06Q 30/0605 705/28 |
| 7,546,257 B2* | 6/2009 | Hoffman | ............ | G06Q 30/0605 705/28 |
| 9,654,485 B1* | 5/2017 | Neumann | ............ | H04L 63/1416 |
| 10,023,114 B2* | 7/2018 | Adams | .................... | B60Q 9/00 |
| 2003/0074206 A1* | 4/2003 | Hoffman | ................ | G06Q 30/04 705/80 |
| 2003/0097317 A1* | 5/2003 | Burk | ...................... | G06Q 10/06 705/30 |
| 2005/0060245 A1* | 3/2005 | Hoffman | ................ | G06Q 30/04 705/28 |

(Continued)

*Primary Examiner* — Don G Zhao

(57) ABSTRACT

Systems and methods described herein provide a cyber risk assessment service. A computing device determines weights for techniques of a cyber security framework based on historical industry impact. The computing device associates an enterprise network with an industry identifier, obtains customer risk data for the enterprise network, and normalizes and/or combines the customer risk data to form normalized risk scores. The computing device maps the customer risk data to corresponding techniques in the cyber security framework, generates technique scores based on the mapping and the normalized risk scores, and generates weighted technique scores using some of the weights selected based on the industry identifier. The computing device calculates an overall security score for the enterprise network based on the weighted technique scores, identifies a corrective recommendation for the overall security score, and provides the overall security score and the corrective recommendation for presentation to a user.

20 Claims, 10 Drawing Sheets

(56) References Cited

U.S. PATENT DOCUMENTS

| | | | | |
|---|---|---|---|---|
| 2006/0015416 | A1* | 1/2006 | Hoffman | G06Q 50/188 705/28 |
| 2008/0270203 | A1* | 10/2008 | Holmes | G06Q 30/0201 705/7.29 |
| 2011/0251978 | A1* | 10/2011 | Davies | G06Q 40/00 705/36 R |
| 2011/0270780 | A1* | 11/2011 | Davies | G06Q 40/06 705/36 R |
| 2013/0166346 | A1* | 6/2013 | Al-Zuhair | G06Q 10/0635 705/7.28 |
| 2018/0241761 | A1* | 8/2018 | Bania | H04L 63/1425 |
| 2018/0336353 | A1* | 11/2018 | Manadhata | G06F 16/3334 |
| 2020/0062274 | A1* | 2/2020 | Kowal | G07C 5/0816 |
| 2020/0097869 | A1* | 3/2020 | Bajaj | G06N 20/00 |
| 2021/0407308 | A1* | 12/2021 | Brubaker | G06Q 10/06393 |

* cited by examiner

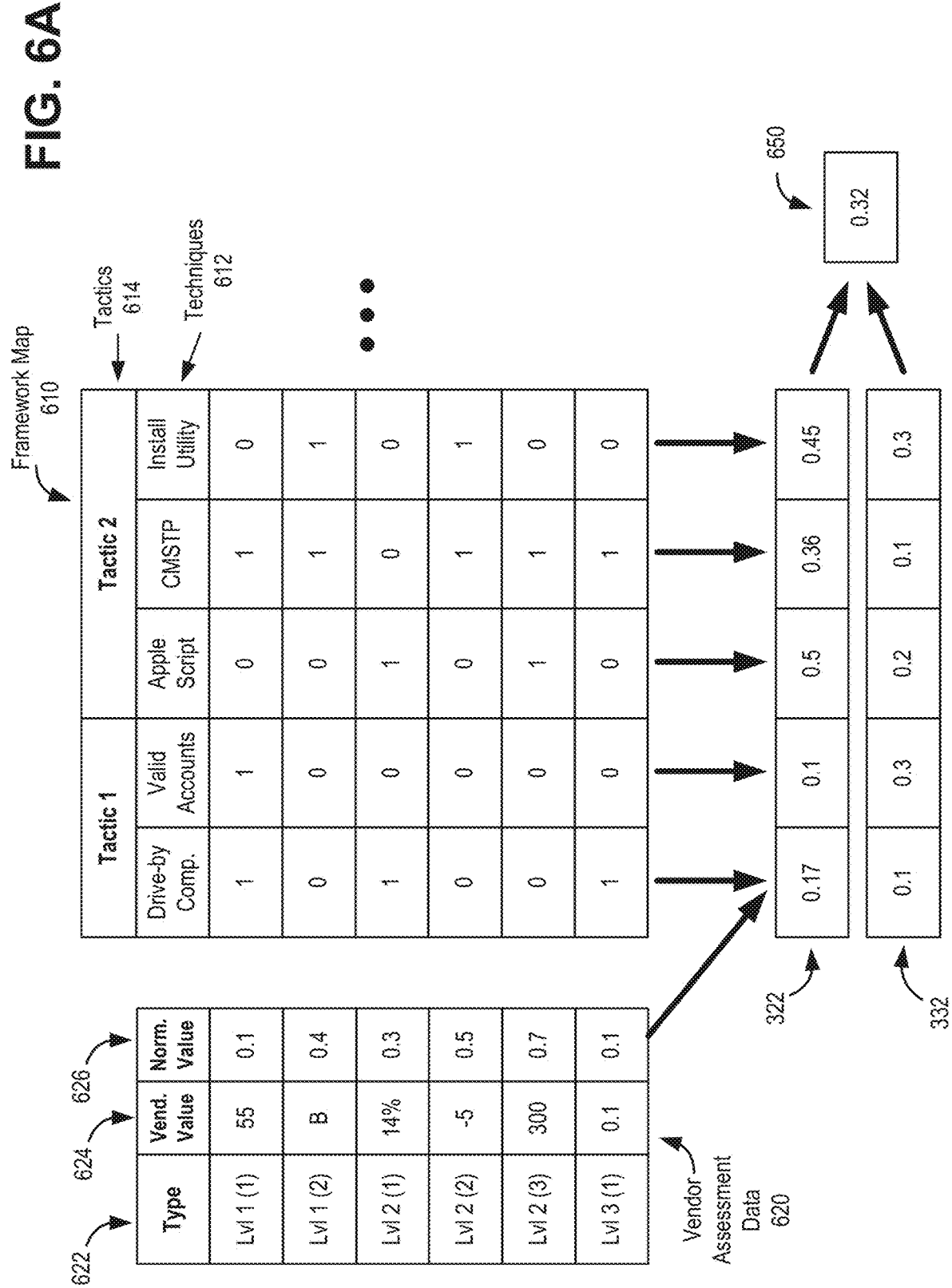

METHOD AND SYSTEM FOR EVALUATING CYBER SECURITY RISKS

BACKGROUND

Cyber security is important not only to protect the unprecedented amounts of data and sensitive information on computers and other devices, but also for the secure transmission of that information. Having a cyber presence exposes an organization to various types of potential cyber-attacks, including attempts to obtain unauthorized access to the network, denial-of-service attacks, and attempts to steal information. To defend against such attacks, organizations use a myriad of cyber defense strategies, including firewalls, password protection schemes, encryption, secure protocols, isolation, and other prophylactic measures. Each of these strategies protect the organization's cyber landscape in different ways (e.g., two-factor authentication protects against impersonation by increasing the difficulty of unauthorized login). However, due the complexity of both internal and external cyber factors, and company goals, both of which are highly individualized, organizations need guidance on their security infrastructure and its effectiveness, in order to combat their particular security threats.

BRIEF DESCRIPTION OF THE DRAWINGS

FIG. 6A illustrates an overall scoring technique according to an implementation;

DETAILED DESCRIPTION OF THE PREFERRED EMBODIMENTS

The following detailed description refers to the accompanying drawings. The same reference numbers in different drawings may identify the same or similar elements.

Particular service providers (e.g. telecommunication providers) are in a unique position to offer cyber risk assessment services that provide periodic reviews of a customer's security conditions to identify potential weaknesses and recommend corrective actions. A threat level may be determined based on a combination of a customer's security posture and the customer's threat environment level. The security posture reflects how well protected the customer's business assets (e.g., network, endpoints, infrastructure, users, practices, etc.) are believed to be, based on various security metrics, characteristics, and parameters. The threat environment level reflects the relative hostility of a particular customer's environment.

Systems and methods described herein provide cyber risk assessment services that generate a rating of a customer's overall security posture as well as breakdowns of how different categories or data types impact the overall security posture, in addition to effectuating a change in the security posture based on the rating. Different types (or levels) of data about a customer (e.g., its network, endpoints, security practices, infrastructure, etc.) may be obtained from various sources. The different data may be normalized and mapped to a standardized cyber security framework. The standardized cyber security framework may include multiple tactics, techniques, and procedures that an attacker might use to gain access to and operate inside of an enterprise network. After an initial score is determined for each applicable technique in the standardized cyber security framework, the risk assessment system may apply weight factors to each technique score based on industry-specific knowledge of the customer's threat environment. The compiled, weighted technique scores may be used to determine an overall security score for the customer. The overall security score may be used to identify and/or effectuate actions to improve the evaluated security posture.

Figure 1:
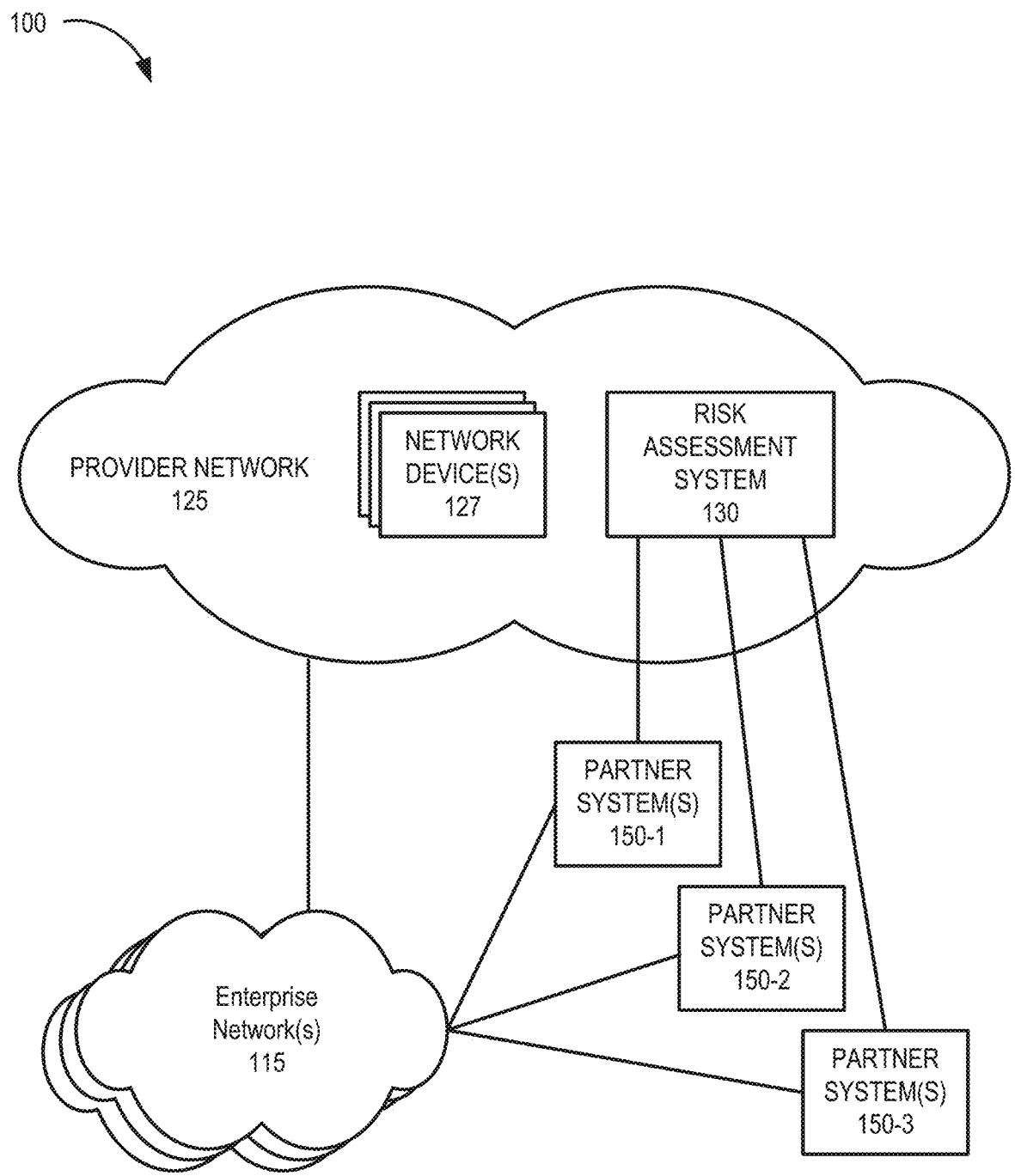
FIG. 1 is a diagram illustrating a network environment in which systems and methods describe herein may be implemented.

FIG. 1 is a diagram of an exemplary network environment 100 in which the cyber risk assessment service described herein may be implemented. As shown in FIG. 1, environment 100 may include one or more customer enterprise networks 115, a provider network 125, and partner systems 150-1 through 150-3 (referred to herein generically as partner systems 150). According to other embodiments, environment 100 may include additional networks, fewer networks, and/or different types of networks than those illustrated and described herein.

Environment 100 includes links between the networks and between devices. Environment 100 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are exemplary.

Enterprise network 115 may include a private network (e.g., a customer network, an in-house network, etc.) which may include a local area network (LAN), a wide area network (WAN), or a combination of networks. Enterprise network 115 may provide network access to devices in provider network 125 or serve as a stand-alone network. Different enterprise networks 115 may have different network identifiers and each enterprise network 115 may have different security protocols and security systems.

Depending on the implementation, enterprise network 115 may include one or multiple types of network devices, such as access devices and servers. For example, access devices may include a next generation Node B (gNB), an evolved Node B (eNB), an evolved LTE (eLTE) eNB, a radio network controller (RNC), a remote radio head (RRH), a baseband unit (BBU), a small cell node (e.g., a picocell device, a femtocell device, a microcell device, a home eNB, a repeater, etc.), a Wi-Fi access point, or another type of wireless node. Servers may, for example, receive and process data from customer devices within or connected to enterprise network 115. In another implementation, enterprise network 115 may include one or more gateway (GW)

routers (e.g., customer premises equipment) that act as a secure gateway for devices within enterprise network 115. In other implementations, enterprise network 115 may employ Software Defined Networking (SDN) conventions, including a separate service orchestration layer, control layer, and resources (or forwarding) layer. Enterprise network 115 may also include regional clusters of network devices and/or virtual nodes to enable use of virtual network endpoints. As used herein, the term "enterprise network" may also collectively refer to customer infrastructure and endpoints/users that access the enterprise network.

Provider network 125 may include one or multiple networks of one or multiple types and technologies associated with, for example, a telecommunications service provider. Provider network 110 may generally include wired, wireless and/or optical networks that are capable of receiving and transmitting data, voice, and/or video signals. For example, provider network 110 may include one or more access networks, IP multimedia subsystem (IMS) networks, core networks, or other networks. According to an exemplary embodiment, provider network 125 includes components to connect and manage different parts of enterprise network 115, though in other instances, provider network 110 may not manage the enterprise network 115.

Depending on the implementation, provider network 125 may include various types of network devices 127. For example, network devices 127 may include a packet data network gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a mobility management entity (MME), a session management function (SMF), a unified data management (UDM) device, an authentication server function (AUSF), a network slice selection function (NSSF), a network repository function (NRF), a policy control function (PCF), a network exposure function (NEF), and/or an application function (AF). According to other exemplary implementations, network devices 127 may include additional, different, and/or fewer network devices than those described. For example, network devices 127 may include a non-standard and/or proprietary network device.

According to an implementation, provider network 125 may include a risk assessment system 130. Risk assessment system 130 may include one or more computing devices and/or network devices (e.g. network devices 127 or separate devices). Risk assessment system 130 may generate a rating of a customer's overall security posture as well as breakdowns of how different categories or data types impact the overall security posture. Risk assessment system 130 may communicate with partner systems 150 and devices in enterprise network. Risk assessment system 130 is described further in connection with, for example, FIG. 2.

Partner systems 150 may include one or more networks and/or network devices that collect data about individual enterprise networks 115. Partner systems 150 may provide the collected data to risk assessment system 130. According to an implementation, partner systems 150 may work with risk assessment system 130 to provide data for different service levels. According to one implementation, the service levels may build on each other. For example, an entry level (e.g., level 1) may provide an outside-in view that gathers data about a customer enterprise network 115 from public sources. A middle level (e.g., level 2) may additionally provide an inside-out view that searches internally (e.g., within enterprise network 115) for malware, unwanted programs, and dual usage tools within endpoints. A highest level (e.g., level 3) may further include an in-depth review of the security culture and processes (C&P) for the customer enterprise network 115. For example, C&P data may be collected based on user surveys and direct customer inquiries. According to another implementation, the service levels may be independent of each other (e.g., level 3 data may not build on level 2 data). In FIG. 1, three partner systems 150 are shown for simplicity. In practice, there may be more or fewer partner systems 150. In some implementations, one or all of partner systems 150 may be provided by or serviced by provider network 125.

In FIG. 1, the particular arrangement and number of components of environment 100 are illustrated for simplicity. In practice, there may be more enterprise networks 115, provider networks 125, and partner systems 150. In other implementations, components of one or more of enterprise networks 115, provider networks 125, and partner systems 150 may be combined. For example, an enterprise network 115 may include risk assessment system 130 and/or a partner system 150 to enable in-house monitoring. According to another implementation, one or more of partner systems 150 may be included within enterprise network 115.

Figure 2A:
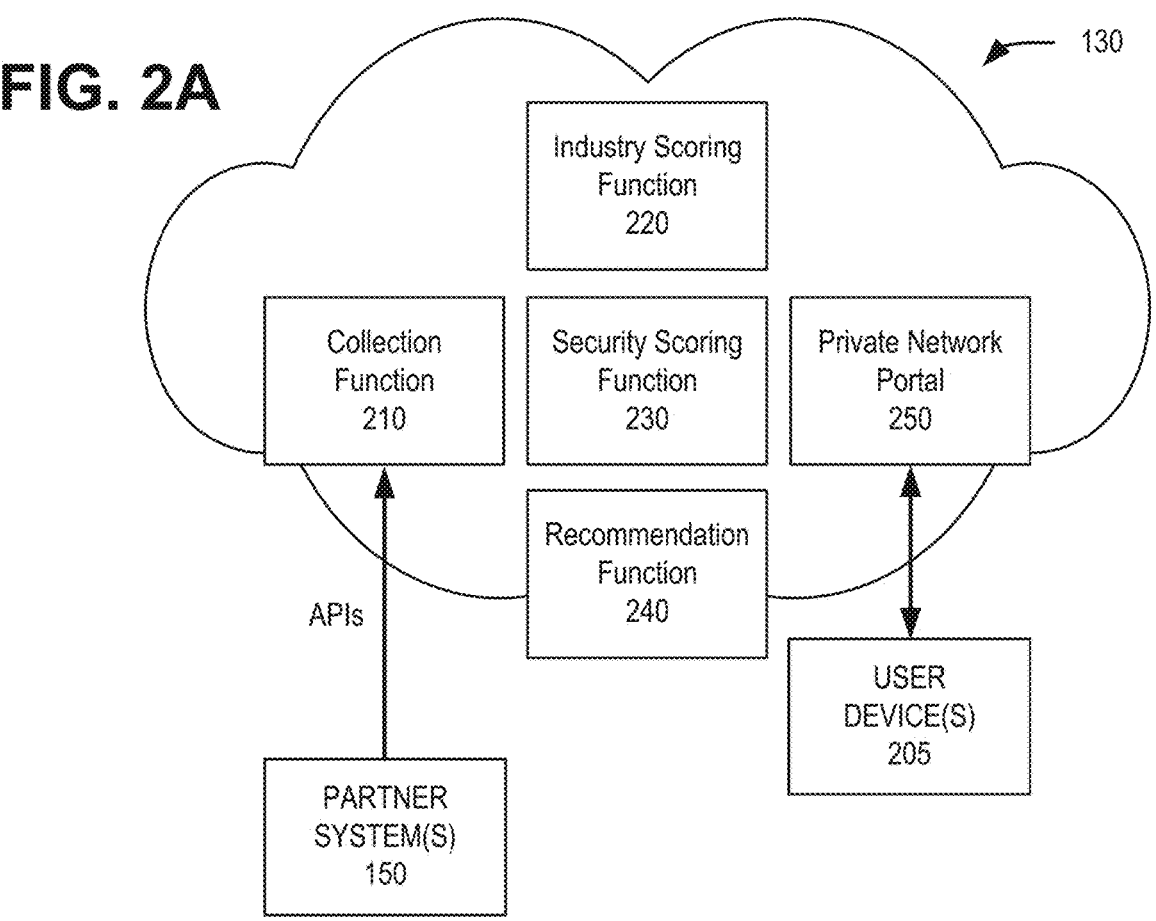
FIGS. 2A and 2B are diagrams illustrating exemplary functional components of the risk assessment system of FIG. 1.

FIG. 2A is a block diagram illustrating components of risk assessment system 130. According to implementations described herein, risk assessment system 130 may include a collection function 210, an industry scoring function 220, a security scoring function 230, a recommendation function 240, and a private network portal 250. Each of collection function 210, industry scoring function 220, security scoring function 230, and private network portal 250 may be implemented in one or more network devices 127, for example. In the example of FIG. 2A, one or more partner systems 150 may access collection function 210, and a user device 205 may access private network portal 250. Some interactions of risk assessment system 130 are described in the context of FIG. 3, which is a diagram illustrating concepts of the risk assessment system.

User device 205 may include any communication or computational device, such as a personal computer, workstation, tablet, smartphone, etc. In one implementation, user device 205 may be a device within enterprise network 115. In another implementation user device 205 may be outside of enterprise network 115 and/or provider network 125. User device 205 may be configured to execute various types of software (e.g., applications, programs, etc.). For example, user device 205 may include a web browser to enable a user to access private network portal 250 as described further below. Alternatively, or additionally, user device 205 may include an application configured to access and present information from private network portal 250.

Collection function 210 may receive and store network security information associated with a customer enterprise network 115 and/or information associated with users of a customer enterprise network 115. For example, collection function 210 may receive data from partner systems 150 to support level 1, level 2, and/or level 3 service levels.

Figure 3:
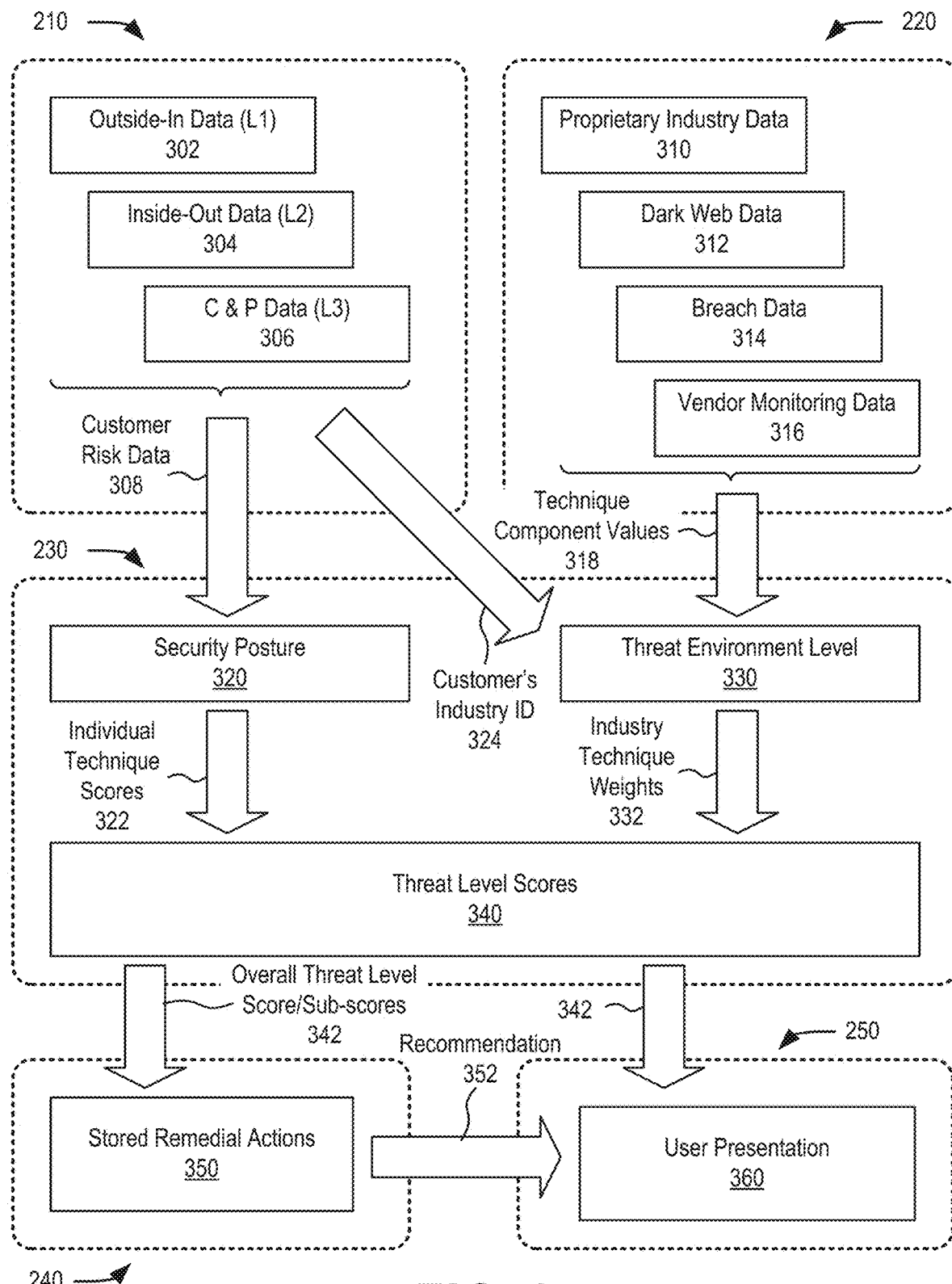
FIG. 3 is a diagram illustrating concepts of the risk assessment system described herein.

As shown in FIG. 3, outside-in data 302 may correspond to level 1 data. Outside-in data 302 may generally include information about a customer's security that can be observed from outside the customer's network environment. Outside-in data 302 may include security ratings based on what an outside attacker could observe or access, such as, for example, the presence of active malware infections, external-facing network vulnerabilities, out-of-date applications, etc.

Inside-out data 304 may correspond to level 2 data. Inside-out data 304 may generally include endpoint threat detection and response data, such as, for example, data collected from monitoring systems and antivirus software. Inside-out data 304 may include ratings and evaluations of endpoint security, which may include both scores and descriptions.

Culture and processes (C&P) data may correspond to level 3 data. C&P data 306 may include an evaluation of employee culture and security practices for a given enterprise network 115. For example, C&P data 306 may be collected through use of surveys and interviews with users of enterprise network 115.

In one implementation, outside-in data 302, inside data 304, and C&P data 306 may be provided to collection function 210 by multiple different vendors of partner systems 150 or from provider network's 125 internally collected data. Outside-in data 302, inside data 304, and C&P data 306 may be collected periodically or on-demand. For example, partner systems 150 may use application programming interfaces (APIs) to securely transmit outside-in data 302, inside-out data 304, and C&P data 306 to collection function 210. Collection function 210 may forward relevant level 1, level 2, and/or level 3 service data to security scoring function 230 as customer risk data 308 for a particular enterprise network 115.

Industry scoring function 220 may evaluate contributions of an industry environment to an enterprise network's security threat. As shown in FIG. 3, industry scoring function 220 may compile and assess industry-related data, including proprietary industry data 310, dark web data 312, breach data 314, and vendor monitoring data 316. Industry scoring function 220 may evaluate the historical contributions of different industry environments to successful attack techniques and assign industry weight values, based on the historical contributions, to each of the techniques of the cyber security framework.

Proprietary industry data 310 may include historical data from forensic analysis of security breaches and/or attempted attacks. For example, proprietary industry data 310 may include a compilation of known security breaches on a global or regional scale. In one implementation, proprietary industry data 310 may be obtained from annual Data Breach Investigation Reports (DBIRs), for example. According to an implementation, a DBIR may include an analysis of information security incidents from a global data set. The DBIR data set may combine data from public and private organizations around the world, including law enforcement agencies, national incident-reporting entities, research institutions, private security firms and major telecommunications service providers. Information in the report is used to identify common attack patterns including point-of-sale intrusions, Web application attacks, insider threats, physical theft, crimeware, payment card skimmers, denial of service, cyber-espionage and miscellaneous errors. The report also describes how often each of the attack vectors is involved in a data breach. For each type of attack, the DBIR maps out the threat actors, types of organizations targeted and the security controls that can best enable enterprises to prevent attacks that result in data breaches.

Dark web data 312 may include recorded instances of an enterprise network's domain name and/or information in the Internet areas that are accessible through specialized software (e.g., the dark web). Breach data 314 may include data breach histories from other vendors which may supplement proprietary industry data 310, for example. Vendor monitoring data 316 may include cyber security data of third parties. For example, vendor monitoring data 316 may include a security analysis of known vendors in a particular industry sector and/or particular vendors that interface with a customer enterprise network 115.

Industry scoring function 220 may analyze attack categories associated with historical cyber security events to determine what techniques are more impactful to particular industries/environments. Examples of different industry groups that may be used as distinguishing identifiers for enterprise networks 150 include, for example, accommodation and food services, arts and entertainment, construction, information, energy, scientific and technical, public administration, transportation and warehousing, defense, education, federal, financial services, healthcare, and manufacturing. According to an implementation, industry scoring function 220 may use attack techniques and tactics defined by the MITRE ATT&CK framework. In another implementation, industry scoring function 220 may apply another known framework, such as the Vocabulary for Event Recording and Incident Sharing (VERIS). Industry scoring function 220 may assign technique component values 318 for different techniques in the cyber security framework. According to an implementation, industry scoring function 220 may incorporate a Markov chain Monte Carlo method, or another a probabilistic model to associate attack techniques with features of different industries/environments.

As described further below, in one implementation, industry scoring function 220 may assign different weights to the same attack techniques applied to different industries, based on historical threat probabilities, such as historical threat probabilities obtained from proprietary industry data 310. For example, the historical risk associated with a drive-by compromise attack may be relatively low in a banking sector compared to a retail sector. Thus, the drive-by compromise attack technique may be weighted lower for an enterprise network 115 in a banking industry than for an enterprise network 115 in the retail industry. Industry scoring function 220 may determine similar weight values for different attack technique and industry combinations. Industry scoring function 220 may include a stored database or table of calculated technique component values 318, for the different industries, which may be updated periodically.

Figure 2B:
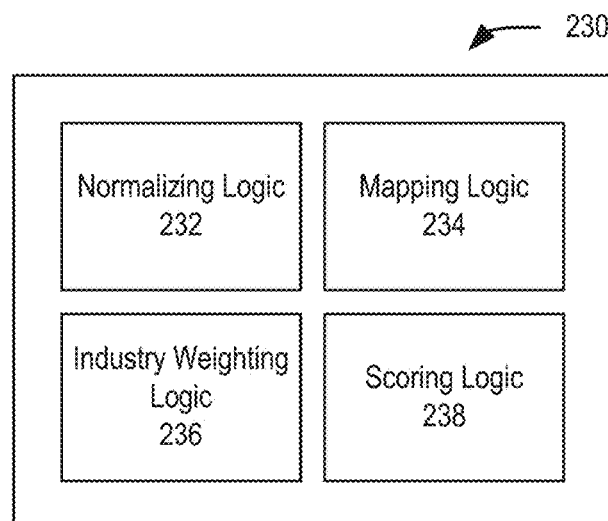

Security scoring function 230 may receive data (customer risk data 308) from collection function 210 and technique weight values (e.g., technique component values 318) from industry scoring function 220. Using customer risk data 308 and applying selected industry specific weights (e.g., from technique component values 318), the security scoring function 230 may generate a security score for a particular enterprise network 115. By combining the threat environment level 330 and the security posture 320, the security scoring function 230 may derive a threat level assessment score 340. As shown in FIG. 2B, according to an implementation, security scoring function 230 may include normalizing logic 232, mapping logic 234, industry weighting logic 236, and scoring logic 238.

Normalizing logic 232 may normalize the collected data (e.g., customer risk data 308) from collection function 210. For example, normalizing logic 232 may transform some or all data from partner systems 150 into a common format that can be compared and/or weighted. Normalizing logic 232 may use customized enhancement/modification procedures to make consistent ranges and/or obtain comparable values for data from the different vendors of partner systems 150. Normalizing logic 232 may output the data in an appropriate format for use with mapping logic 234. According to an implementation, normalizing logic 232 may be configured in advance for participating vendors/sources of outside-in data 302, inside-out data 304, and/or C&P data 306. Normalizing logic 232, example, match qualitative and quantitative scoring data from different sources to a uniform numerical scale (e.g. from 0 to 1).

Mapping logic 234 may map vendor network security information to categories of a recognized cyber security framework, such as the MITRE ATT&CK framework. For example, in one implementation, mapping logic 234 may apply guidelines from subject matter experts to perform mapping of a customer risk data categories. In other implementations, mapping logic 234 may perform off-line computations, machine learning, or user-assisted learning to match particular types of vendor data to one or more related cyber-attack techniques. Prior to receiving customer risk data for a specific enterprise network 115, mapping logic may store a table or another data structure that matches general features of the customer risk data to the corresponding techniques in the cyber security framework. Mapping logic 234 may then match actual scored data (e.g., customer risk data 308) for a particular enterprise network to categories in the cyber security framework. The mapped categories may represent a security posture 320 irrespective of a particular industry or environment for enterprise network 115. Mapping logic 234 may forward to industry weighting logic 236 individual technique scores 322 in the cyber security framework.

Industry weighting logic 236 may receive, from collection function 210 or a stored customer record, one or more industry identifiers 324 that indicate a corresponding industry for a particular customer enterprise network 115 (e.g., and corresponding to customer risk data 308). Based on the industry identifiers 324, industry weighting logic 236 may select applicable weights from the technique component values 318 received from industry scoring function 220. The applicable weights for the industry ID 324 may be used to determine a threat environment level 330 for the specific enterprise network 115. The applicable weights may be provided to scoring logic 238 as technique threat environment (TE) weights 332.

Scoring logic 238 may compile industry weighted technique scores to generate threat level scores 340. For example, industry technique TE weights 332 may be applied to technique scores 322 from mapping logic 234 to convert technique scores 322 to industry weighted technique scores. The industry weighted technique scores may be presented, based on the threat level scores, as threat level scores 340 by technique, by tactic, by partner system 150 (e.g., vendor), or as an overall security posture compilation. According to one implementation, the overall security score may be correlated to a percentage, number range (e.g., from 1 to 1000), letter (e.g., A, B, C, D, F), or a descriptive assessment (poor, average, good, etc.). In another implementation, the overall security score may be converted to and/or combined with additional factors to indicate a threat level that can be presented to a customer. Additionally, or alternatively, scoring logic 238 may identify sub-scores for techniques or categories of the cyber security framework. For example, scoring logic 238 may identify and rank contributors (e.g., by vendor data, by category, by technique, etc.) that impact an overall security score/threat level. As described below, results (e.g., threat level scores 340) from security scoring function 230 may be provided to and/or accessed via, for example, private network portal 250. For example, an overall threat level score and sub-scores 342 may be provided to private network portal 250 for access by authorized users for a specific enterprise network 115.

Recommendation function 240 may include logic to identify adverse impacting scores and provide recommended actions to improve a threat level score. According to one implementation, as shown in FIG. 3, recommendation function 240 may store a database of remedial actions 350 that may be used to strengthen a security posture for each type of attack technique. Recommendation function 240 may receive overall threat level score and sub-scores 342 from security scoring function 230. Recommendation function 240 may identify one or more sub-scores (e.g., a threat level scores for a technique) that provides the largest negative impact to a customer's overall threat level score. For the identified technique(s), recommendation function 240 may retrieve (e.g. from stored remedial actions 350) one or more known remedial actions that may be used to improve security for the particular technique.

Private network portal 250 may provide controlled external access to output from scoring function 230 and/or recommendation function 240. For example, private network portal 250 may enable an authorized customer to access threat level scores and recommendations for customer enterprise network 115. In one implementation, private network portal 250 may provide a common web-based interface to access a user interface (e.g., user presentation 360) that provides a variety sub-scores and a breakdown of a corresponding overall security score. Access to data and/or services via private network portal 250 may be restricted, for example, to users with registered accounts and secure passwords (or other credentials).

Although FIGS. 2A, 2B, and 3 describe certain logical components of risk assessment system 130 in other implementations, risk assessment system 130 may include fewer logical components, different logical components, or additional logical components than depicted in these figures. Additionally or alternatively, one or more logical components of risk assessment system 130 may perform functions described as being performed by one or more other logical components.

Figure 4:
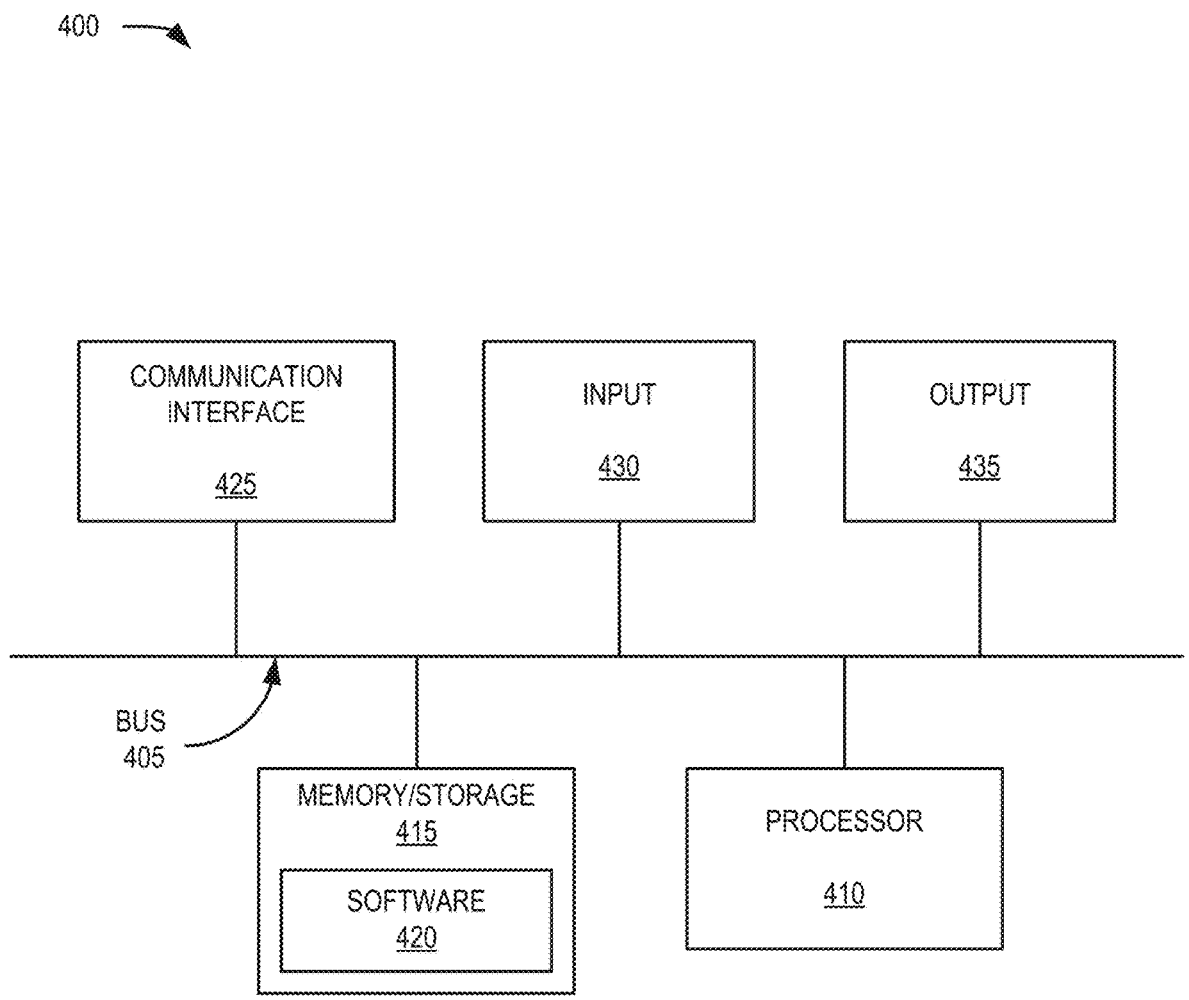
FIG. 4 is a diagram of exemplary components that may be included in one or more of the devices shown in FIGS. 1-3.

FIG. 4 is a diagram illustrating exemplary components of a device 400 that may correspond to one or more of the devices described herein. For example, device 400 may correspond to components included in network devices 127, risk assessment system 130, partner systems 150, and user devices 205. As illustrated in FIG. 4, according to an exemplary embodiment, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a communications path, a system bus, an address bus, a data bus, and/or a control bus. Bus 405 may also include bus drivers, bus arbiters, bus interfaces, and/or clocks.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc. Processor 410 may be a dedicated component or a non-dedicated component (e.g., a shared resource).

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include a drive for reading from and writing to the storage medium.

Memory/storage 415 may be external to and/or removable from device 400, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. Software 420 may include an operating system. Software 420 is also intended to include firmware, middleware, microcode, hardware description language (HDL), and/or other forms of instruction. Software 420 may include logic for network devices 127, for example, to perform features of risk assessment system 130 described herein. Additionally, for example, use device 205 may include logic to perform tasks, as described herein, based on software 420.

Communication interface 425 permits device 400 to communicate with other devices, networks, systems, devices, and/or the like. Communication interface 425 includes one or multiple wireless interfaces and/or wired interfaces. For example, communication interface 425 may include one or multiple transmitters and receivers, or transceivers. Communication interface 425 may include one or more antennas. For example, communication interface 425 may include an array of antennas. Communication interface 425 may operate according to a protocol stack and a communication standard. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 435 permits an output from device 400. For example, output 435 may include a speaker, a display, a light, an output port, and/or some other type of visual, auditory, tactile, etc., output component. According to some embodiments, input 430 and/or output 435 may be a device that is attachable to and removable from device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
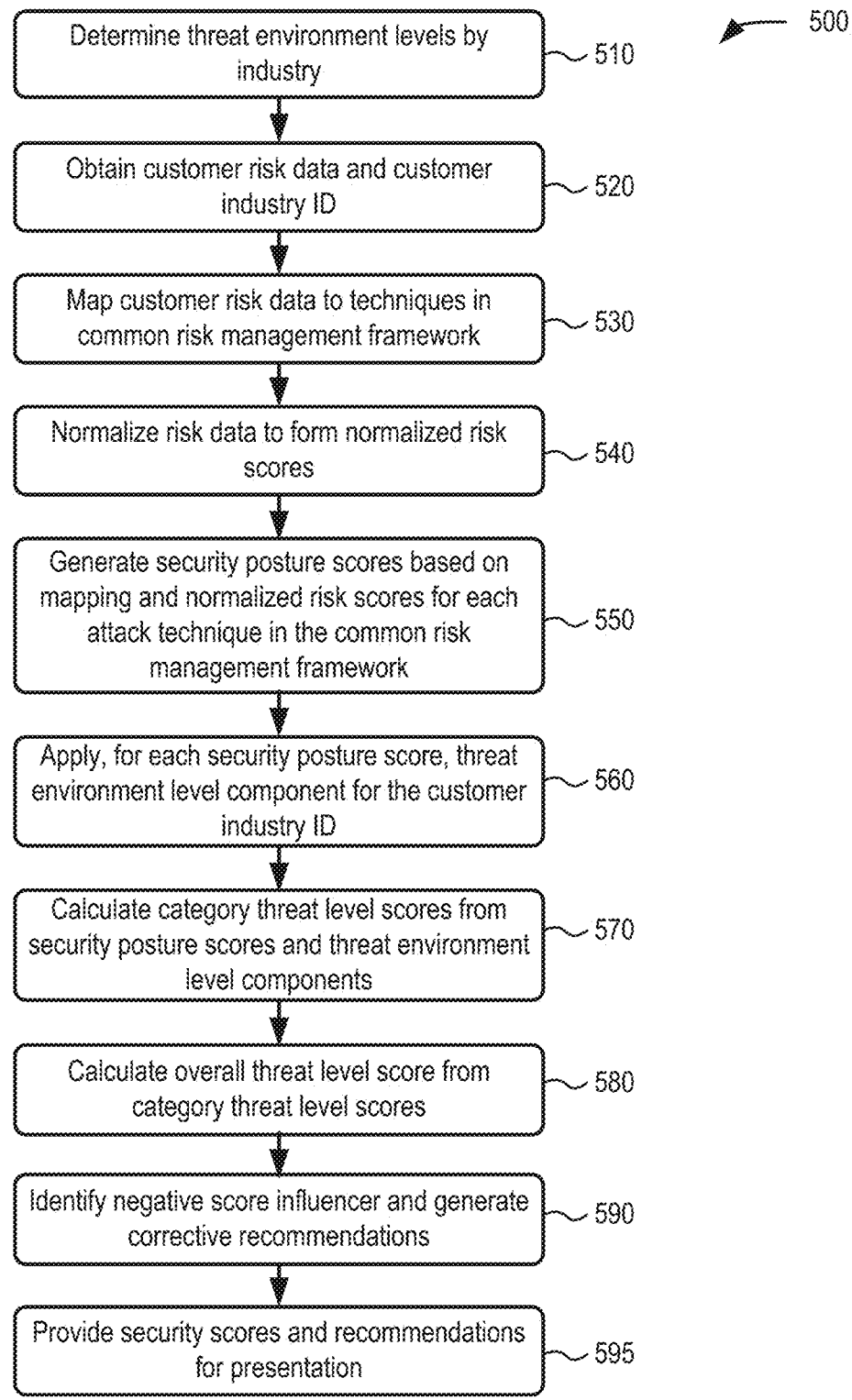
FIG. 5 is a flow diagram illustrating an exemplary process for conducting cyber risk assessment scoring, according to an implementation described herein.

FIG. 5 is a flow diagram illustrating an exemplary process 500 for conducting cyber risk assessment scoring, according to an implementation described herein. In one implementation, process 500 may be implemented by risk assessment system 130. In another implementation, process 500 may be implemented by risk assessment system 130 in conjunction with one or more other devices in network environment 100.

Process 500 may include determining threat environment levels by industry (block 510). For example, as described above in connection with FIGS. 2A and 3, risk assessment system 130 (e.g., industry scoring function 220) may evaluate contributions of different industry environments to a security threat. In one implementation, industry scoring function 220 may compile data from DBIRs (e.g., proprietary industry data 310) and other data sources to determine an industry component (e.g., technique component values 318) for different attack techniques. Industry scoring function 220 may assign the same or different industry weight values to a technique, depending on the industry impact. Industry scoring function 220 may store a database or table of technique components/weights for different industries, which may be updated periodically.

Process 500 may also include obtaining customer risk data and a customer industry identifier (block 520), and mapping customer risk data to techniques in a common risk management framework (block 530). For example, partner systems 150 may provide assessment data (e.g., a qualitative or quantitative security rating) to risk assessment system 130 (e.g., collection function 210) to support a level 1, a level 2, or a level 3 service for a customer enterprise network 115. The assessment data may include a rating (e.g., a vendor's proprietary or standardized score) based on outside-in data 302, inside-out data 304, and/or C&P data 306. Based on the type of vendor data, risk assessment system 130 (e.g., mapping logic 234 of scoring function 230) may associate each type of assessment data from partner systems 150 with one or more techniques in a cyber security framework. For example, a particular outside-in data 302 type may be associated with multiple different tactic/technique components of a MITRE ATT&CK framework. According to an implementation, vendor data types for participating sources of outside-in data 302, inside-out data 304, and/or C&P data 306 may be mapped to techniques of the cyber security framework off-line. The customer industry identifier may be a stored record associated with the customer (e.g. during a registration process with the provider network) or included as part of vendor data.

Process 500 may further include normalizing risk data to form normalized risk scores (block 540), and generating security posture scores, based on the mapping and the normalized risk scores, for each attack technique in the common risk management framework (block 550). For example, risk assessment system 130 (e.g., normalizing logic 232 of scoring function 230) may normalize the collected data (e.g., customer risk data 308). Normalizing logic 232 may use customized enhancement/modification procedures to make consistent ranges and/or obtain comparable values for data from different vendors. Values from normalized risk data may be merged with the mapped techniques of the cyber security framework. For example, as described further below in connection with FIG. 6A, each of the normalized risk scores from each vendor may be matched to one or more pre-determined corresponding techniques in the cyber security framework. The average of the normalized risk scores may be taken for each technique to generate individual security posture scores for each technique (e.g., technique scores 322).

Process 500 may additionally include applying, for each security posture score, a threat environment level component for the customer industry identifier (block 560). For example, risk assessment system 130 (e.g., industry weighting logic 236 of scoring function 230) may select, from technique component values 318, predetermined components/weights for each technique (e.g., technique TE weights 332) based on the industry identifier 324 assigned to a specific customer enterprise network 115. The selected technique component values 318 are technique TE weights 332 for the specific enterprise network 115. Scoring logic 328 may multiply the respective technique scores 322 by the technique TE weights 332 to generate threat level scores for each technique (or applicable technique(s)) in the cyber security framework.

Process 500 may additionally include calculating category threat level scores from security posture scores and threat environment level components (block 570), and calculating overall threat level score from category threat level scores (block 580). For example, security scoring function 230 (e.g., scoring logic 238) may apply corresponding technique TE weights 332 to technique scores 322 to generate threat level scores 340 for each technique or category. The threat level scores (e.g., a technique score 322 with an applied technique TE weight 332) may be presented for individual techniques, for groups of techniques (e.g., a tactic), or for particular vendors (e.g., partner system 150). In one implementation, the threat level scores for each technique may be summed to generate an overall threat level score 340. The overall threat level score may be correlated to a percentage, number range (e.g., from 1 to 1000), letter (e.g., A, B, C, D, F), or a descriptive assessment (poor, average, good, excellent, etc.).

Process 500 may include identifying negative score influencer and generate corrective recommendations (block 590), and providing security scores and recommendations for presentation (block 595). For example, recommendation function 240 may identify one or more sub-scores (e.g., a threat level scores for a technique) that provides the largest negative impact to a customer's overall threat level score. For the identified technique, recommendation function 240 may retrieve (e.g. from store repository of remedial actions) one or more known remedial actions that may be used to improve security for the particular technique. Private network portal 250 may retrieve results from security scoring function 230 and recommendation function 240 to present to a customer (via user device 205).

According to an implementation, individual threat level scores or groups of threat level scores may be presented as sub-scores of the overall threat level score to indicate contributions of particular techniques or tactics, for example, to the overall threat level score.

Figure 6B:
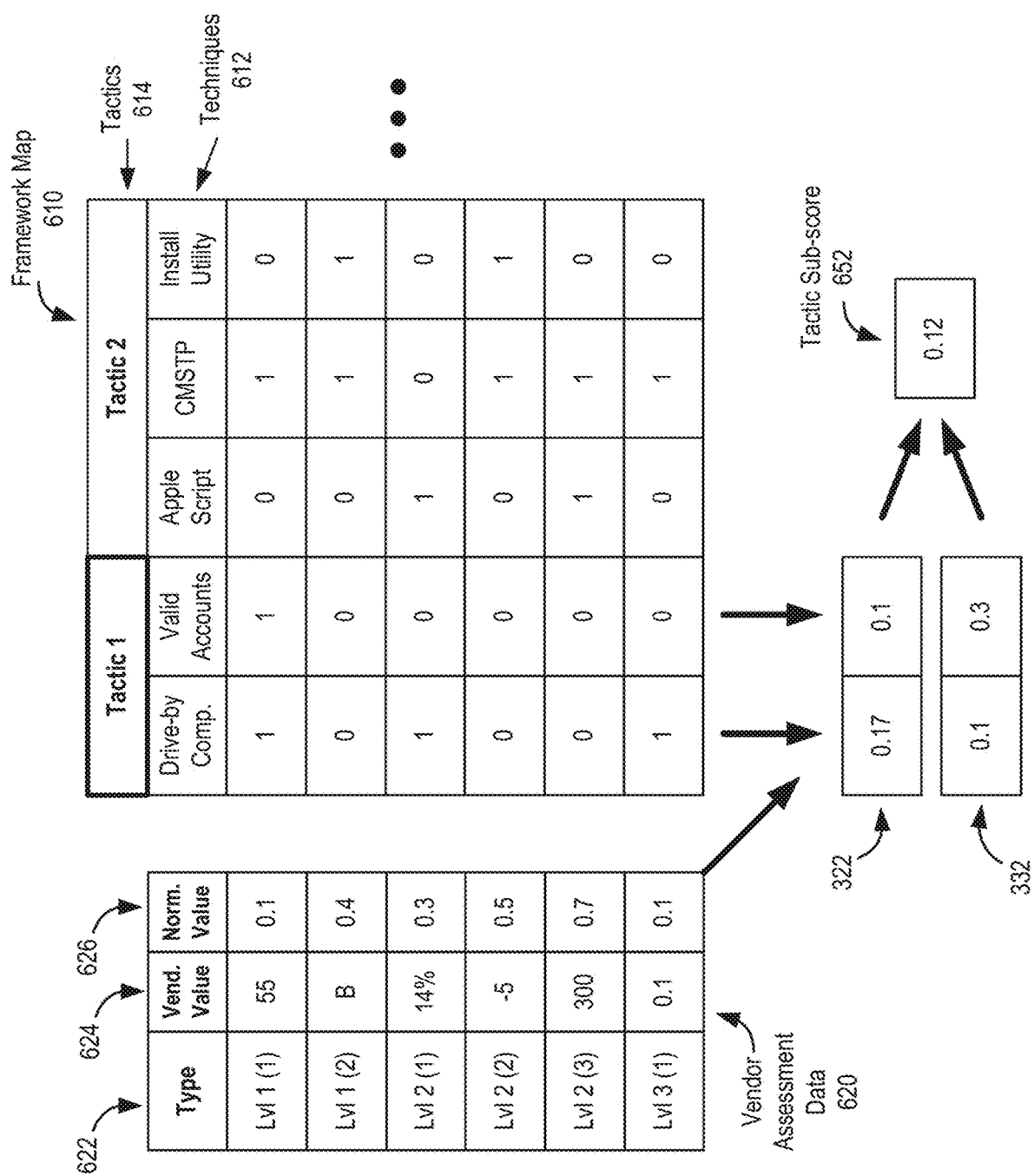
FIG. 6B illustrates a category and vector scoring technique, according to another implementation.

FIGS. 6A-6D illustrate use cases for the cyber risk assessment service. A framework map 610 may associate different cyber-attack techniques 612 with types 622 of vendor assessment data 620 from partner systems 150. Framework map 610 may associate one or more techniques 612 with a tactic 614 or another type of category. In FIG. 6A, framework map 610 shows five techniques 612 distributed among two tactics 614 for simplified illustration. In other implementations, FIG. 6A may include more techniques 612 and/or tactics 614.

Vendor assessment data 620 may include types of data 622, vendor data values 624 (e.g., corresponding to customer risk data 308), and normalized values 626 for a particular enterprise network 115. The amount of different types 622 may depend on the number of participating partner systems 150 and the service level for enterprise network 115. Each partner system 150 may provide vendor data values 624 for a specific customer (e.g., enterprise network 115). Normalized values 626 may be calculated, by normalizing logic 232, based on corresponding vendor data values 624.

Mapping logic 234 may use framework map 610 to associate types 622 of vendor assessment data 620 with different techniques 612. In the example of FIG. 6A, mapping types 622 to techniques 612 may be a binary option (e.g., 1="yes" and 0="no"). In another implementation, types 622 of vendor assessment data 620 may be mapped to non-binary values for a technique 612. In the example of FIG. 6A, the assessment score "Lvl 1 (1)" from a particular vendor may be mapped to multiple techniques, including "Drive-by Compromise," "Valid Accounts," and "CMSTP" (e.g., a Connection Manager Profile Installer executable) techniques 612. Similarly, the assessment score "Lvl 2 (1)" from a different vendor may be mapped to "Drive-by Compromise" and "Apple Script" techniques 612.

Mapping types 622 of vendor assessment data 620 to applicable techniques 612 in framework map 610 may be performed off-line. After vendor data values 624 are received and normalized into normalized values 626, risk assessment system 130 may apply the actual normalized values 626 to corresponding techniques 612 for each type 622. More particularly, the normalized values 626 may be multiplied by technique values, and non-zero values in each technique column may be averaged to generate individual technique scores 322 for the specific enterprise network 115.

Risk assessment system 130 may apply technique TE weights 332 to each individual technique scores 322. For example, industry weighting logic 236 may apply the industry identifier for enterprise network 150 to determine a set of weights to apply to individual technique scores 322. Scoring logic 238 may apply the corresponding technique TE weight 332 to each technique score 322 and calculate a sum of the weighted technique scores. A combination of the weighted technique scores may be used to calculate a customer's overall security score 650. The overall security score may be used to present a threat level for a customer. In one implementation, the overall security score 650 may be converted from a decimal range of 0 (good) to 1 (bad) to a threat level score in a different format that may be presented to a user. For example, the overall security score 650 may be converted to a threat level in the range of 0 (bad) to 1000 (good), a letter grade ("A," "B,", "C,", etc.), a color (green, yellow, red, etc.), a rating (excellent, good, poor, etc.), and/or other indicators. The threat level score may be provided to private network portal 250 for presentation to a user/customer of enterprise network 115.

Referring to FIG. 6B, overall security score 650 may be broken down into sub-scores by tactic 614. For example, for the "tactic 1" tactic, scoring logic 238 may apply the procedures of FIG. 6A to calculate weighted technique scores for techniques 612 associated with "tactic 1" tactic 614. In the example of FIG. 6B, the resulting tactic sub-score 652 may represent a numerical value. According to an implementation, scoring logic 238 may convert tactic sub-score 652 into a non-numerical value, such as a rating or grade, or a percentage of the overall security score.

Figure 6C:
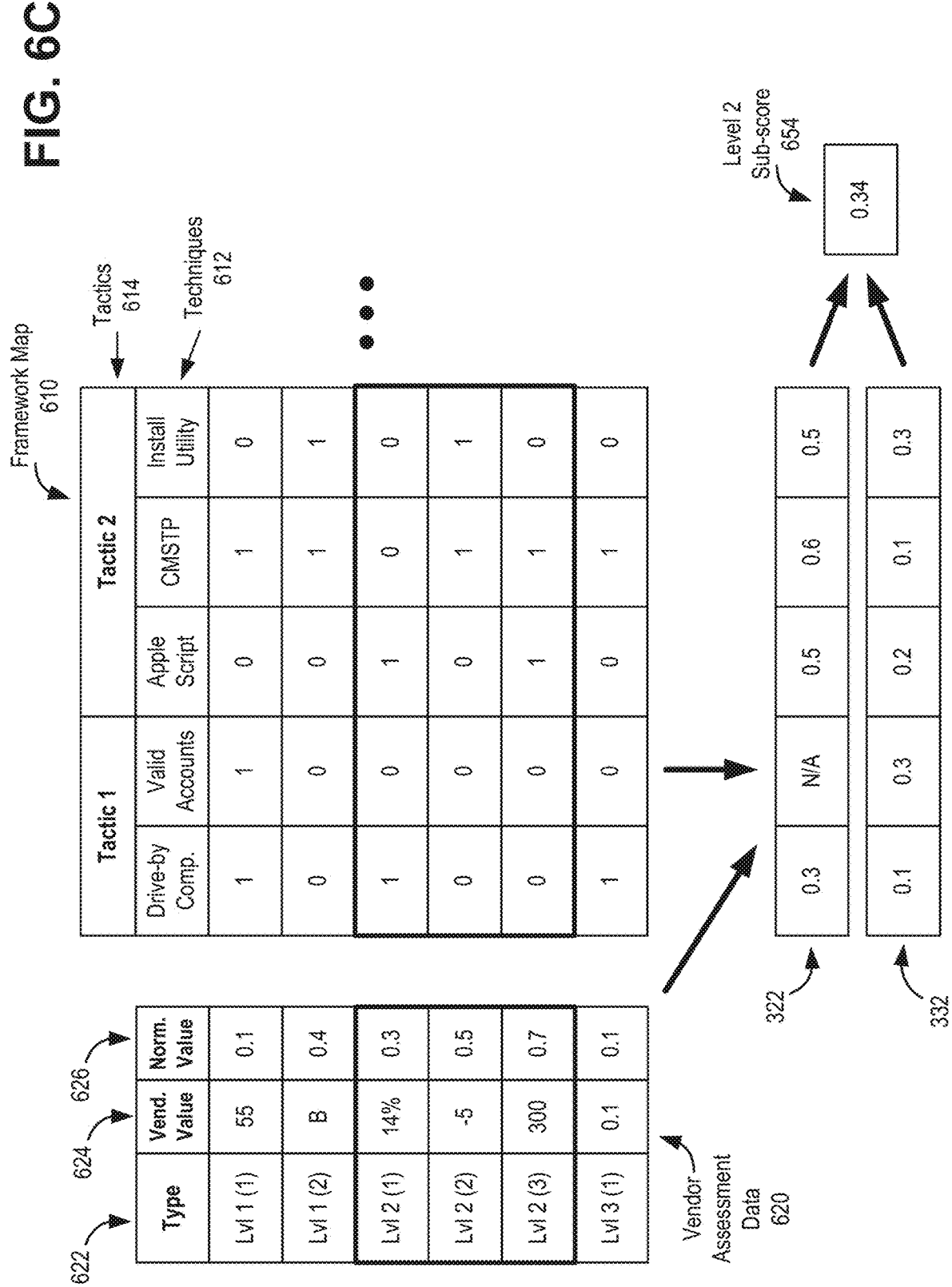
FIG. 6C illustrates a category level scoring technique, according to still another implementation.

Referring to FIG. 6C, overall security score 650 may be broken down into sub-scores by service level. For example, for service level 2 (e.g., "Lvl 2 (1)," "Lvl 2 (2)," and "Lvl 2 (3),"), scoring logic 238 may apply the procedures of FIG. 6A to calculate weighted technique scores for techniques 612 associated with level 2 partner data. In the example of FIG. 6C, the resulting level 2 sub-score 654 may represent a numerical value. According to an implementation, scoring logic 238 may convert level 2 sub-score 654 into a non-numerical value or a percentage of the overall security score.

Figure 6D:
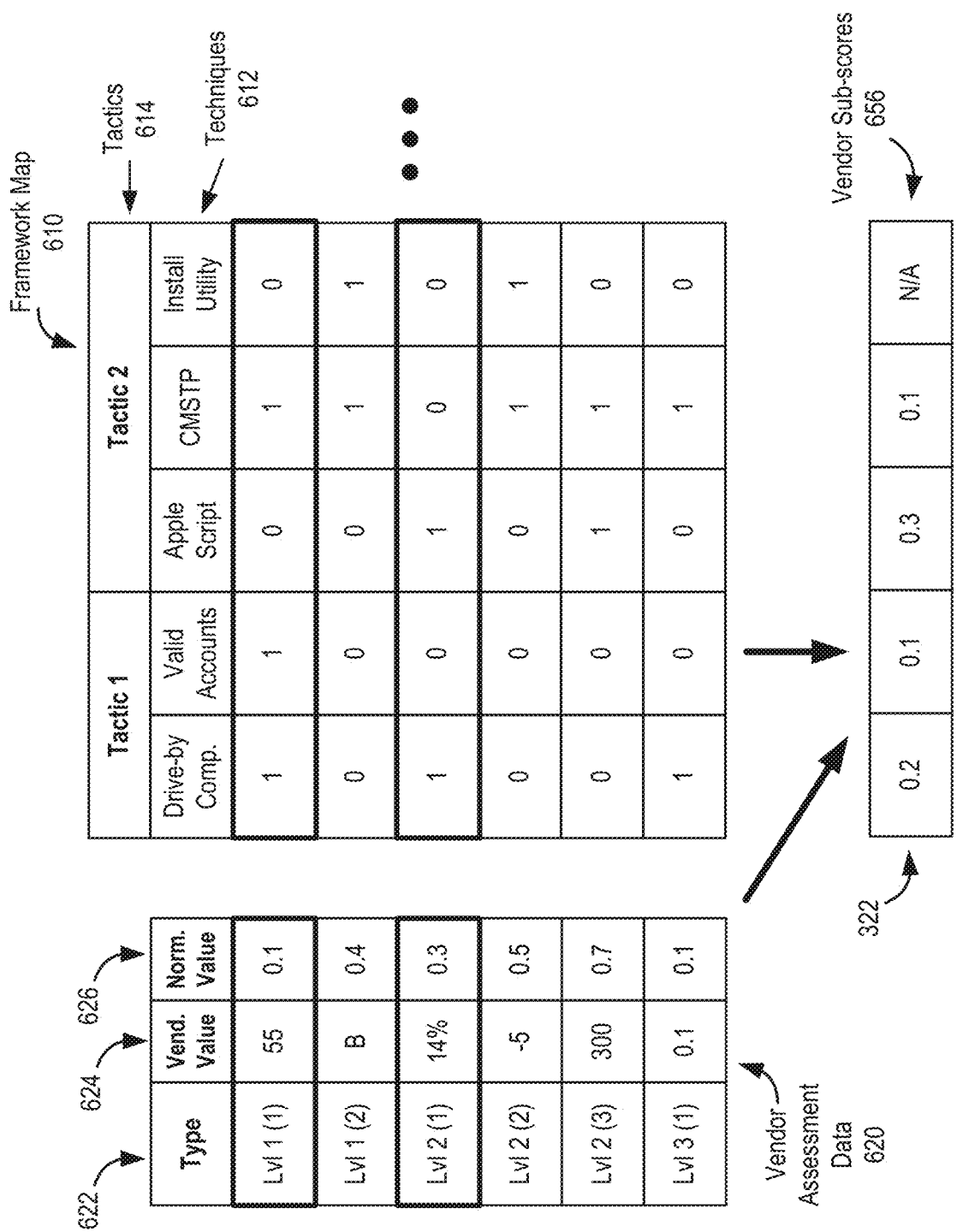
FIG. 6D illustrates a vendor vector scoring technique, according to yet another implementation.

Referring to FIG. 6D, technique scores 322 may be broken down by vendor (e.g., partner system 150). Assume, for example, the same partner system 150 provides "Lvl 1 (1)" and "Lvl 2 (1)" vendor assessment data 620. After vendor data values 624 are received and normalized into normalized values 626, risk assessment system 130 (e.g., scoring logic 238) may apply the actual normalized values 626 for "Lvl 1 (1)" and "Lvl 2 (1)" to corresponding techniques 612. The normalized values 626 may be multiplied by technique values, and non-zero values in each technique column may be averaged to generate individual vendor sub-scores for each of technique scores 322 for data from particular partner system 150 for the specific enterprise network 115. Additionally, or alternatively, vendor scores may be further broken down by individual tactics.

Figure 7:
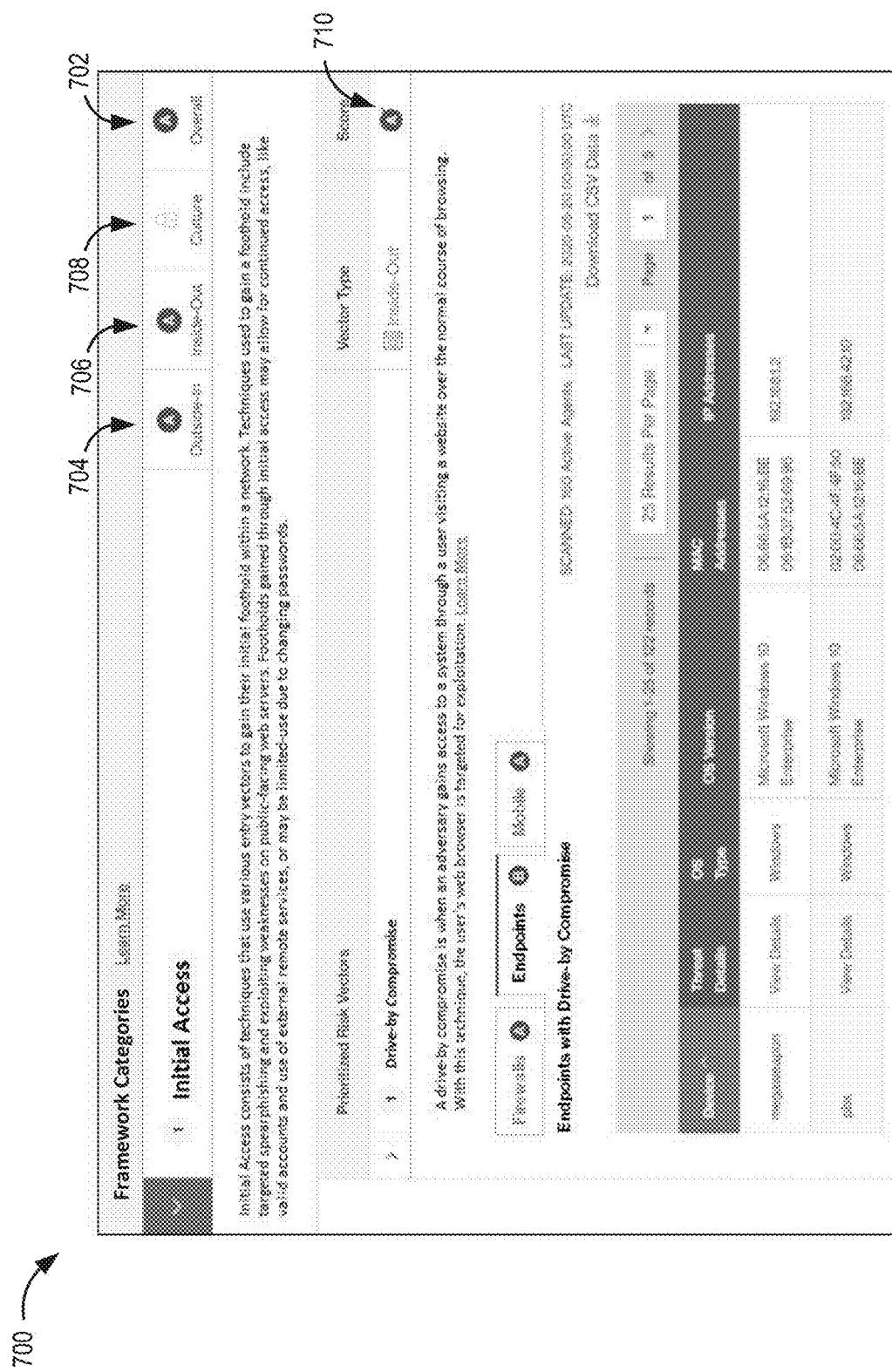
FIG. 7 is an exemplary user interface for presenting cyber risk assessment scoring to a customer.

FIG. 7 depicts a diagram of an exemplary user interface 700 that is capable of being generated by private network portal 250. In the example of FIG. 7, user interface 700 may include a graphical user interface (GUI). In other implementation, user interface 700 may include a non-graphical user interface, such as a text-based interface. User interface 700 may be used to present a customer's scores and sub-scores for the cyber risk assessment service.

As shown in FIG. 7, results from the cyber risk assessment service may be presented to users/customers via private network portal 250 in a user interface 700. In one implementation a customer's threat level score, for example, may be reflected as an overall grade (e.g., "A", "B", "C", etc.). In another implementation, user interface 700 may include a security score for a particular tactic 614. As shown in FIG. 700, a tactic score for "tactic 1" tactic 614 may be provided in tactic grade field 702. Similarly, sub-score fields 704, 706, and 708 may also be included to present scores for each service level of a customer's subscription, if applicable (e.g., corresponding to service level scoring techniques described in FIG. 6C). Breakdowns with scores for individual techniques 612 may be included in techniques field 710. User interface 700 may additionally provide the ability to present breakdowns for individual vendors such as vendor scores 656 described in FIG. 6D.

The foregoing description of implementations provides illustrations, but is not intended to be exhaustive or to limit the invention to the precise form disclosed. Modifications and variations are possible in light of the above teachings or may be acquired from practice of the invention. For example, while a series of blocks have been described with regard to FIG. 5, and message/operation flows with respect to FIG. 3, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining, by one or more computing devices, different weights for attack techniques of a cyber security framework based on historical industry impact of cyber-attacks in different industry environments;
   associating, by the one or more computing devices, an enterprise network with an industry identifier of multiple industry identifiers, wherein the industry identifier indicates a corresponding industry for the enterprise network;
   obtaining, by the one or more computing devices, customer risk data for the enterprise network;
   normalizing, by the one or more computing devices, the customer risk data to form normalized risk scores;

mapping, by the one or more computing devices, the customer risk data to corresponding techniques in the cyber security framework;
generating, by the one or more computing devices, technique scores based on the mapping and the normalized risk scores;
selecting, by the one or more computing devices and based on the industry identifier, a set of industry-specific weights, from the different weights, to apply to the technique scores;
generating, by the one or more computing devices, weighted technique scores based on the set of weights and the technique scores;
calculating, by the one or more computing devices, an overall security score for the enterprise network based on the weighted technique scores;
identifying a corrective recommendation for the overall security score; and
providing, by the one or more computing devices, the overall security score and the corrective recommendation for presentation to a user.

2. The method of claim 1, wherein the mapping includes associating the customer risk data with multiple attack techniques in the cyber security framework.

3. The method of claim 1, further comprising:
calculating category security scores from the weighted technique scores.

4. The method of claim 1, further comprising:
storing, in a memory, a generic mapping of customer risk data to the cyber security framework; and
storing, prior to obtaining the customer risk data, the different weights associated with the multiple industry identifiers.

5. The method of claim 1, wherein normalizing the customer risk data comprises:
storing settings for converting individual vendor security ratings to a uniform numerical scale;
receiving multiple security ratings for the enterprise network, wherein the multiple security ratings include a rating based on an outside-in data view and a rating based on an inside-out data view; and
matching each of the multiple security ratings to a uniform numerical scale.

6. The method of claim 1, wherein determining the weights for the techniques of the cyber security framework comprises:
evaluating historical contributions of different industry environments to successful attack techniques; and
assigning industry weight values, based on the historical contributions, to each of the techniques of the cyber security framework.

7. The method of claim 1, wherein mapping the customer risk data further comprises:
matching, prior to receiving the customer risk data for the enterprise network, general features of the customer risk data to the corresponding techniques in the cyber security framework.

8. The method of claim 1, wherein providing the overall security score for presentation to the user further comprises:
providing category sub-scores for the overall security score.

9. One or more computing devices, comprising:
one or more processors configured to:
determine different weights for attack techniques of a cyber security framework based on historical industry impact of cyber-attacks in different industry environments;
associate an enterprise network with an industry identifier of multiple industry identifiers, wherein the industry identifier indicates a corresponding industry for the enterprise network;
obtain customer risk data for the enterprise network;
normalize the customer risk data to form normalized risk scores;
map the customer risk data to corresponding techniques in the cyber security framework;
generate technique scores based on the mapping and the normalized risk scores;
select, based on the industry identifier, a set of industry-specific weights, from the different weights, to apply to the technique scores;
generate weighted technique scores based on the set of weights and the technique scores;
calculate an overall security score for the enterprise network based on the weighted technique scores;
identify a corrective recommendation for the overall security score; and
provide the overall security score and the corrective recommendation for presentation to a user.

10. The one or more computing devices of claim 9, wherein, providing the overall security score, the one or more processors are further configured to:
generate a graphical user interface that includes a presentation of the overall security score.

11. The one or more computing devices of claim 9, wherein the one or more processors are further configured to:
calculate category security scores from the weighted technique scores.

12. The one or more computing devices of claim 9, wherein the one or more processors are further configured to:
store, in a memory, the different weights for techniques in the cyber security framework; and
select, from the different weights, the some of the weights based on the industry identifier.

13. The one or more computing devices of claim 9, wherein, normalizing the customer risk data, the one or more processors are further configured to:
receive multiple security ratings for the enterprise network, wherein the multiple security ratings include a rating based on an outside-in data view and a rating based on an inside-out data view.

14. The one or more computing devices of claim 13, wherein the multiple security ratings include a rating based on culture and processes associated with the enterprise network.

15. The one or more computing devices of claim 9, wherein, when mapping the customer risk data, the one or more processors are further configured to:
generate, prior to receiving the customer risk data for the enterprise network, a table matching general features of the customer risk data to the corresponding techniques in the cyber security framework.

16. The one or more computing devices of claim 9, wherein, when providing the overall security score for presentation to the user, the one or more processors are further configured to:
provide category sub-scores of the overall security score.

17. A non-transitory computer-readable medium containing instructions executable by at least one processor, the computer-readable medium comprising one or more instructions to cause the at least one processor to:

determine different weights for attack techniques of a cyber security framework based on historical industry impact of cyber-attacks in different industry environments;

associate an enterprise network with an industry identifier of multiple industry identifiers, wherein the industry identifier indicates a corresponding industry for the enterprise network;

obtain customer risk data for the enterprise network;

normalize the customer risk data to form normalized risk scores;

map the customer risk data to corresponding techniques in the cyber security framework;

generate technique scores based on the mapping and the normalized risk scores;

select, based on the industry identifier, a set of industry-specific weights, from the different weights, to apply to the technique scores;

generate weighted technique scores based on the set of weights and the technique scores;

calculate an overall security score for the enterprise network based on the weighted technique scores;

identify a corrective recommendation for the overall security score; and provide the overall security score and the corrective recommendation for presentation to a user.

18. The non-transitory computer-readable medium of claim 17, wherein the instructions to providing the overall security score further comprise instructions to cause the at least one processor to:

generate a graphical user interface that includes a presentation of the overall security score.

19. The non-transitory computer-readable medium of claim 17, further comprising instructions to cause the at least one processor to:

calculate category security scores from the weighted technique scores.

20. The non-transitory computer-readable medium of claim 17, further comprising instructions to cause the at least one processor to:

store the different weights; and select, from the different weights, the some of the weights based on the industry identifier.

* * * * *